(12) United States Patent
Tajika et al.

(10) Patent No.: US 9,744,705 B2
(45) Date of Patent: Aug. 29, 2017

(54) CONTROLLER FOR INJECTION MOLDING MACHINE

(71) Applicant: FANUC Corporation, Yamanashi (JP)

(72) Inventors: Masaya Tajika, Yamanashi (JP); Tatsuhiro Uchiyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 203 days.

(21) Appl. No.: 14/681,861

(22) Filed: Apr. 8, 2015

(65) Prior Publication Data

US 2015/0290857 A1 Oct. 15, 2015

(30) Foreign Application Priority Data

Apr. 9, 2014 (JP) ................................ 2014-080518

(51) Int. Cl.
*B29C 45/76* (2006.01)
*B29C 45/34* (2006.01)
*B29C 45/80* (2006.01)

(52) U.S. Cl.
CPC .. *B29C 45/762* (2013.01); *B29C 2945/76076* (2013.01); *B29C 2945/76113* (2013.01); *B29C 2945/76387* (2013.01); *B29C 2945/76391* (2013.01); *B29C 2945/76561* (2013.01);
(Continued)

(58) Field of Classification Search
CPC ........ B29C 45/762; B29C 2945/76859; B29C 2945/76387; B29C 2945/76391; B29C 2945/76866; B29C 2945/76561; B29C 2945/76869; B29C 2945/76076; B29C 2945/76555; B29C 2945/76551; B29C 2945/76113
See application file for complete search history.

(56) References Cited

U.S. PATENT DOCUMENTS 5,772,932 A * 6/1998 Kamiguchi ........... B29C 45/561
264/328.7
5,906,777 A * 5/1999 Kamiguchi ............. B29C 45/70
264/40.1
(Continued)

FOREIGN PATENT DOCUMENTS

CN 102189621 A 9/2011
JP H07-256722 A 10/1995
(Continued)

OTHER PUBLICATIONS

Office Action mailed Jun. 30, 2015, corresponding to Japanese patent application No. 2014-080518.
(Continued)

*Primary Examiner* — Alison L Hindenlang
*Assistant Examiner* — Jerzi H Moreno Hernandez
(74) *Attorney, Agent, or Firm* — Hauptmah Ham, LLP

(57) ABSTRACT

A time Gt from the start of an injection step until a mold clamping operation is complete is compared with an operation time Ct for a mold clamping step. For Gt<Ct, the injection step is started when a time Dt equal to a difference between Gt and Ct elapses. On the other hand, for Gt≥Ct, after the start of the injection step, a movable platen is stopped at a mold touch position until the time Dt elapses. When the time Dt elapses, the mold clamping step is started.

6 Claims, 5 Drawing Sheets

(52) U.S. Cl.
CPC ............ *B29C 2945/76859* (2013.01); *B29C 2945/76866* (2013.01); *B29C 2945/76869* (2013.01)

(56) References Cited

U.S. PATENT DOCUMENTS

| | | | |
|---|---|---|---|
| 6,585,919 B1* | 7/2003 | Osawa | B29C 45/76 264/328.1 |
| 2007/0057392 A1* | 3/2007 | Yoshida | B29C 45/762 264/40.1 |
| 2007/0122513 A1* | 5/2007 | Nishimura | B29C 45/768 425/150 |
| 2009/0012656 A1* | 1/2009 | Uchiyama | B29C 45/762 700/306 |
| 2009/0053347 A1* | 2/2009 | Shimodo | B29C 33/04 425/143 |

FOREIGN PATENT DOCUMENTS

| | | |
|---|---|---|
| JP | H08-90621 A | 4/1996 |
| JP | 2006-15527 A | 1/2006 |
| JP | 2009-234144 A | 10/2009 |
| JP | 2013-75382 A | 4/2013 |

OTHER PUBLICATIONS

Office Action in CN Application No. 201510163111.9, dated Jan. 19, 2017.

\* cited by examiner

FIG. 6
PRIOR ART
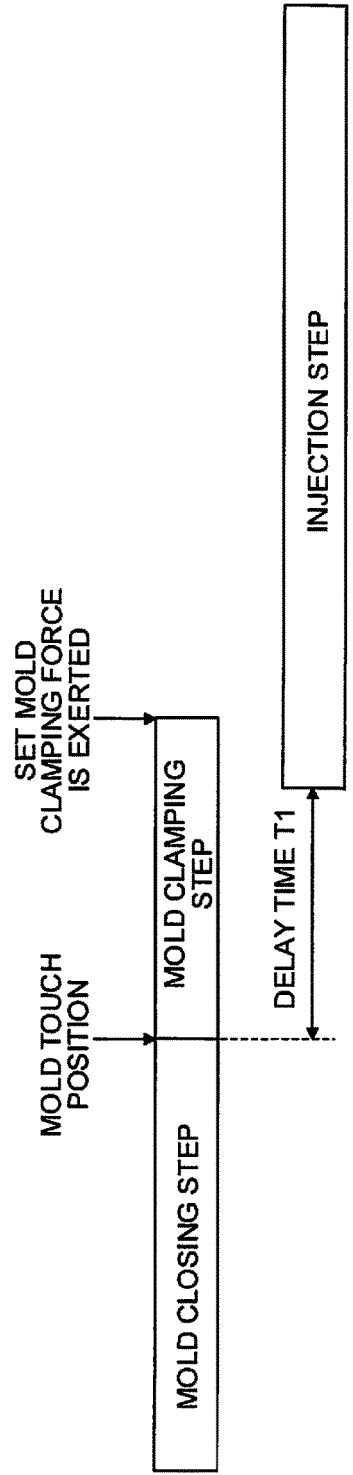
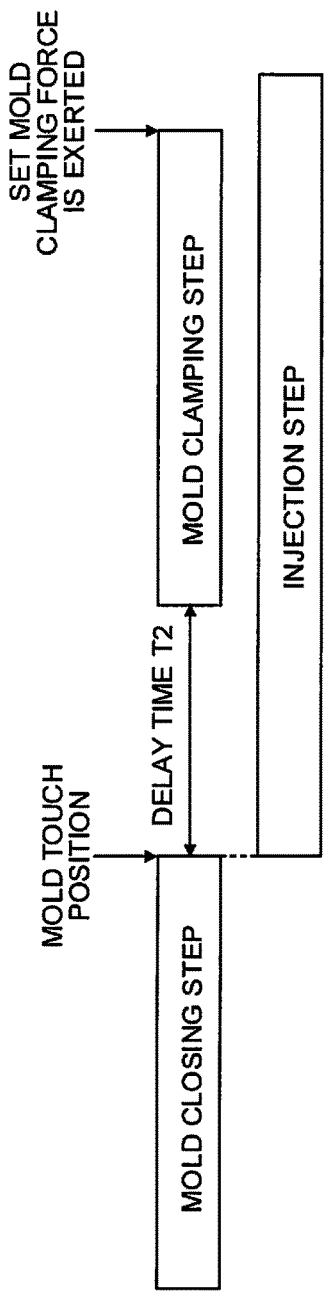

CONTROLLER FOR INJECTION MOLDING MACHINE

RELATED APPLICATIONS

The present application claims priority to Japanese Application Number 2014-080518, filed Apr. 9, 2014, the disclosure of which is hereby incorporated by reference herein in its entirety.

BACKGROUND OF THE INVENTION

Field of the Invention

The present invention relates to a controller for an injection molding machine.

Description of the Related Art

In injection molding, a step of moving a movable platen forward to close molds is divided into a mold closing step and a mold clamping step. The mold closing step is a step of moving the movable platen forward in a mold closing direction to cause a movable-side mold and a fixed-side mold to touch each other. Furthermore, the mold clamping step is a step executed after the mold closing step to move the movable platen further forward from the mold touch position to exert a predetermined mold clamping force.

An operation in which mold clamping and injection are carried out at the same time to reduce cycle time is conventionally known (Japanese Patent Application Laid-Open No. 2006-15527, Japanese Patent Application Laid-Open No. 7-256722, and Japanese Patent Application Laid-Open No. 8-90621). Furthermore, such a simultaneous operation of mold clamping and injection is known to be useful for avoiding inappropriate molding such as a "burn". FIG. 6 is a diagram illustrating operation timings for the conventional mold clamping and injection steps.

When a resin is injected into a cavity of a mold while gas remains in the cavity, the gas is compressed by the resin that has entered the cavity as a result of the injection. The temperature and pressure of the gas are thus increased to cause a "burn" in a molded article. The use of the simultaneous operation of the above-mentioned mold clamping and injection is effective for suppressing a possible "burn" because a high mold clamping force is not exerted in the injection step of filling the cavity with the resin, so that the gas is easily vented from the molds through a small gap between the molds.

Japanese Patent Application Laid-Open No. 7-256722 discloses that, after the mold clamping step is started, a start timing for the injection step is set based on a delay time from the mold touch (time T1 in (1) in FIG. 6). However, in this setting method, as the injection step is started after the mold clamping step is started, the effect that facilitates venting of the gas from the molds through the gap is limited.

To further improve the gas venting, a method may be used in which, after the mold closing step is ended at the mold touch position, injection is immediately started, while the start of the mold clamping step is delayed. However, performing this operation needs setting of the delay time from the mold touch in the mold closing step until the mold clamping step is started (time T2 in (2) in FIG. 6).

Thus, in the related art, when operating conditions for an injection molding machine are set so as to allow a reduction in cycle time and gas venting to be achieved, the delay times T1 and T2 depicted in FIG. 6 are needed to be set based on the start timings for the mold clamping step and the injection step. An operator who sets the operating conditions for the injection molding machine needs to set each of the delay times (T1 or T2). Consequently, the setting is disadvantageously complicated.

SUMMARY OF THE INVENTION

Thus, an object of the present invention is to provide a controller for an injection molding machine which enables desired effects for a reduction in cycle time and gas venting to be exerted by an easy method of simply setting a gas venting time for a mold clamping step and an injection step.

A controller for an injection molding machine according to the present invention is configured to simultaneously execute at least a part of a mold clamping step and at least a part of an injection step, the controller including a first time setting section configured to set a time from start of the injection step until completion of a mold clamping operation as a first time (gas venting time Gt described below), a second time acquiring section that acquires an operating time for the mold clamping step as a second time (mold clamping operation time Ct described below), and an injection step starting section that starts the injection step when a time equal to a difference between the first time and the second time elapses after the mold clamping step is started, if the first time is shorter than the second time.

The second time acquiring section may be configured to acquire the second time by actually performing the mold clamping operation using the injection molding machine and measuring the second time.

The second time acquiring section may be configured to calculate the second time from a moving distance, a moving speed, and acceleration and deceleration in the mold clamping step.

The controller may be configured to stop a movable platen at a mold touch position until the time equal to the difference between the first time and the second time elapses after the injection step is started and then to start the mold clamping step when the time equal to the difference elapses, if the first time is longer than the second time.

The controller may be configured to simultaneously start the injection step and the mold clamping step if the first time is longer than the second time.

The present invention enables desired effects for a reduction in cycle time and gas venting to be exerted by an easy method of simply setting a gas venting time for the mold clamping step and the injection step.

BRIEF DESCRIPTION OF THE DRAWINGS

The above-described and other objects and features of the present invention will be apparent from the following description of embodiments with reference to attached drawings, in which:

FIG. 6 is a diagram illustrating operation timings for a conventional mold clamping step and a conventional injection step.

DETAILED DESCRIPTION OF THE PREFERRED EMBODIMENTS

An injection molding cycle executed by an injection molding machine includes steps for mold closing, mold clamping, injection, cooling, plasticization/metering, mold opening, and ejection. A controller for an injection molding machine according to the present invention has means for setting a time from the start of an injection step until exertion of a set mold clamping force, which corresponds to an interval during which gas is easily vented through a gap in molds, as a gas venting time Gt. The controller thus automatically adjusts timings for the start of an injection step and the start of a mold clamping operation based on the magnitude relationship between the set gas venting time Gt and a mold clamping operation time Ct, to produce desired effects for a reduction in cycle time and gas venting.

Figure 1:
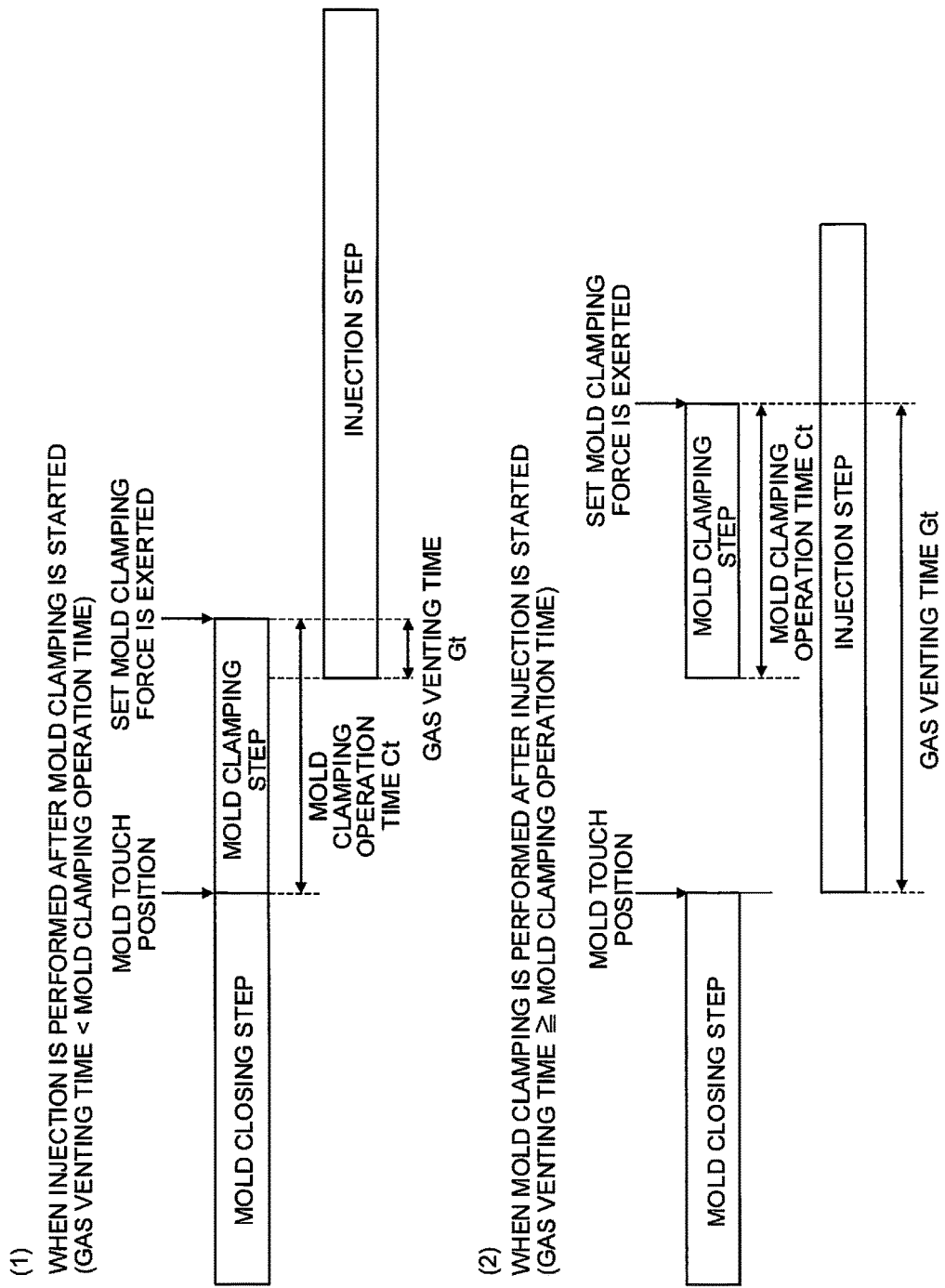
FIG. 1 is a diagram depicting operation timings for a mold clamping step and an injection step executed by a controller for an injection molding machine according to the present invention.

FIG. 1 depicts operation timings for the mold clamping step and injection step executed by the controller for the injection molding machine according to the present invention.

In FIG. 1, a case where injection is started after mold clamping is started (gas venting time Gt<mold clamping operation time Ct) is illustrated in (1), and a case where mold clamping is started after injection is started (gas venting time Gt≥mold clamping operation time Ct) is illustrated in (2). The injection step is generally a step of filling the inside of a cavity in molds with resin, and the injection step may include filling the inside of a cavity with resin using pressure holding depending on molding. Thus, according to the present invention, steps of filling the inside of the cavity with resin are collectively referred to as an injection step. The injection step may or may not include a pressure holding step.

First, a method for acquiring the mold clamping operation time Ct, which is the operation time for the mold clamping step, will be described in detail.

The mold clamping operation time Ct is acquired based on a moving distance X that is the distance a movable platen or a crosshead moves until a desired mold clamping force is exerted (that is, the moving distance the movable platen moves in the mold clamping step, or the moving distance the crosshead moves, which causes the movable platen to move, in a toggle molding machine), the moving speed V of the movable platen or the crosshead, and a time constant A for acceleration and deceleration of the movable platen or the crosshead. The moving speed V of the movable platen or the crosshead and the time constant A for the acceleration and deceleration of the movable platen or the crosshead are set on a screen of the injection molding machine or stored beforehand in storage means (a memory 34 in FIG. 5) of the injection molding machine.

Figure 2:
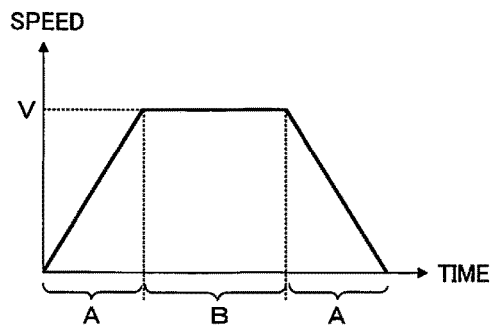
FIG. 2 is a diagram depicting an example of acceleration and deceleration control in a mold clamping operation.

As depicted in FIG. 2, the mold clamping operation time Ct needed when the movable platen is linearly accelerated and decelerated in the mold clamping step is calculated by:

$$Ct = 2A + B = 2A + (X/V - A) = X/V + A \quad (1)$$

B: the time for which the movable platen operates at a constant speed V.

The mold clamping operation time Ct may be determined by performing beforehand the mold clamping operation using the actual injection molding machine and measuring the mold clamping operation time Ct.

In a first embodiment of the controller for the injection molding machine according to the present invention, the gas venting time Gt is compared with the mold clamping operation time Ct, and (a) for Gt<Ct, after the mold clamping step is started, the injection step is started when a time equal to the difference between Gt and Ct elapses. On the other hand, (b) for Gt≥Ct, after the injection step is started, the movable platen is stopped at a mold touch position until the time equal to the difference between Gt and Ct elapses, and when the time equal to the difference elapses, the mold clamping step is started. Thus, an injection start operation and a mold clamping start operation according to the first embodiment will be described using a flowchart in FIG. 3. The operations will be described in accordance with steps in the flowchart.

[Step sa01] The movable platen is moved forward in a mold closing direction to a mold touch position.

[Step sa02] The absolute value Dt of the difference between the gas venting time Gt and the mold clamping operation time Ct is determined.

[Step sa03] A time t is set to 0.

[Step sa04] The controller determines whether or not the gas venting time Gt is shorter than the mold clamping operation time Ct. When the gas venting time Gt is shorter than the mold clamping operation time Ct (Yes), the controller shifts to step sa05. When the gas venting time Gt is not shorter than the mold clamping operation time Ct (No), the controller shifts to step sa09.

[Step sa05] Mold clamping is started.

[Step sa06] The controller determines whether or not the time t is equal to or longer than Dt determined in step sa02. When the time t is equal to or longer than Dt (Yes), the controller shifts to step sa08. Otherwise (No), the controller shifts to step sa07.

[Step sa07] An elapsed time from the start of the mold clamping is put in the place of time t. The controller returns to step sa06. The elapsed time from the start of the mold clamping is measured using a timer function provided in the controller for the injection molding machine.

[Step sa08] Injection is started and the processing is ended.

[Step sa09] The injection is started.

[Step sa10] The controller determines whether or not the time t is equal to or longer than Dt determined in step sa02. When the time t is equal to or longer than Dt (Yes), the controller shifts to step sa11. Otherwise (No), the controller shifts to step sa12.

[Step sa11] Mold clamping is started, and the processing is ended.

[Step sa12] An elapsed time from the start of mold clamping is put in the place of time t. The controller returns to step sa10.

The controller for the injection molding machine according to the first embodiment performs the following control. (a) When the set gas venting time Gt is shorter than the acquired mold clamping operation time Ct (Gt<Ct, and the determination result in step sa04 is Yes; this corresponds to (1) in FIG. 1), the movable platen moves forward to the mold touch position to end a mold closing step, and then, the mold clamping step is immediately started. The injection step is started when the time (time Dt) equal to the difference between the gas venting time Gt and the mold clamping operation time Ct elapses after the start of the mold clamping step.

On the other hand, (b) when the set gas venting time Gt is longer than the acquired mold clamping operation time Ct (Gt≥Ct, and the determination result in step sa04 is No; this corresponds to (2) in FIG. 1), the movable platen moves forward to the mold touch position to end a mold closing step, and then, the injection step is immediately started. The mold clamping step is started when the time for which the movable platen is stopped at the mold touch position becomes equal to the difference (time Dt) between the gas venting time Gt and the mold clamping operation time Ct. In this case, the injection is started while molds are in touch with each other, that is, before the mold clamping step is started. Thus, besides an effect that reduces cycle time, an effect is produced which allows gas in the molds to be easily vented from the molds through a small gap between the molds as the injection proceeds.

Figure 4:
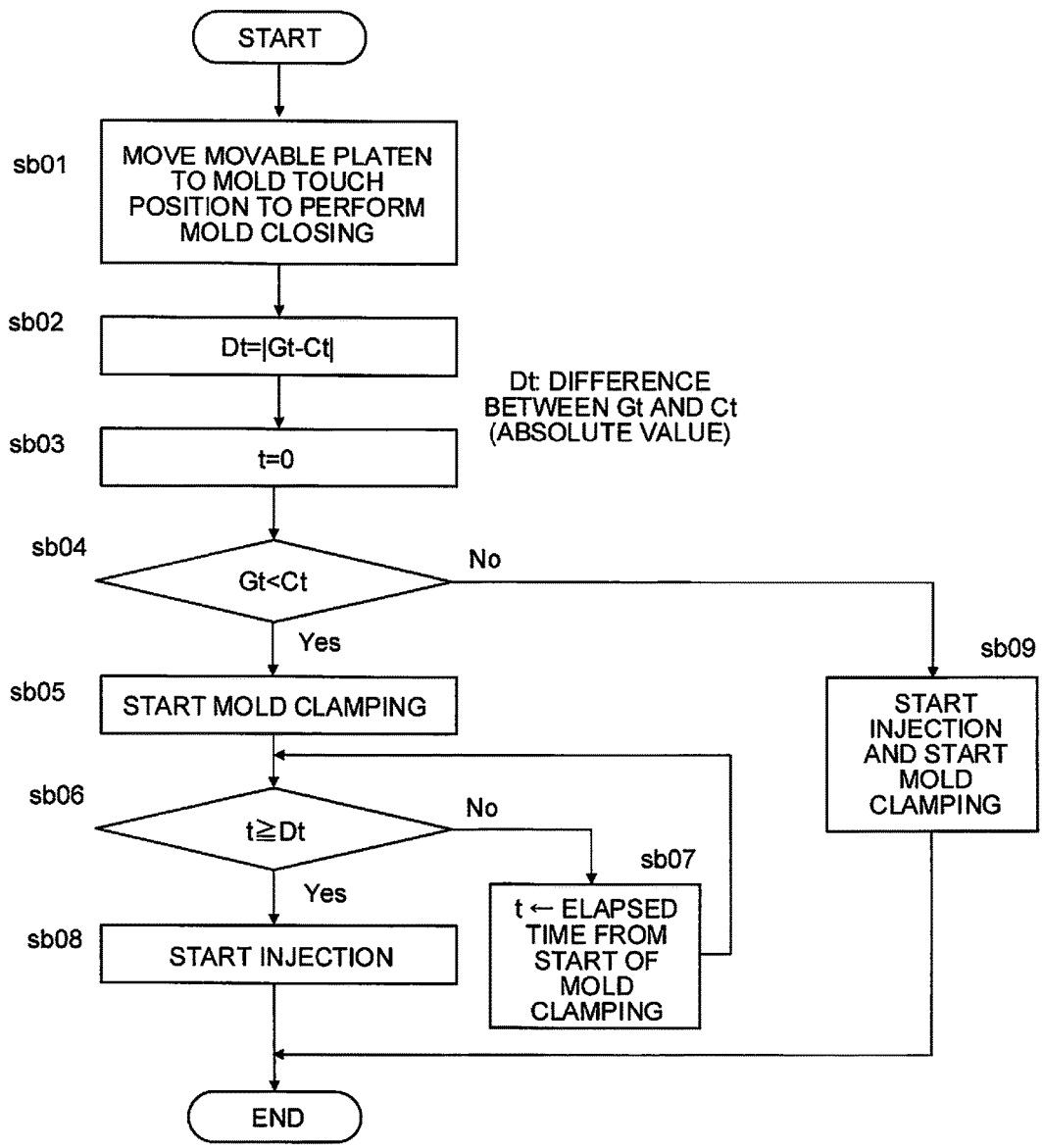
FIG. 4 is a flowchart illustrating the injection start operation and the mold clamping start operation performed by a second embodiment of the controller for the injection molding machine according to the present invention.

In a second embodiment of the controller for the injection molding machine according to the present invention, the gas venting time Gt is compared with the mold clamping operation time Ct, and (a) for Gt<Ct, after the mold clamping step is started, the injection step is started when the time equal to the difference between Gt and Ct elapses. On the other hand, (b) for Gt≥Ct, the injection step and the mold clamping step are simultaneously started. Thus, the injection start operation and the mold clamping start operation of the controller according to the second embodiment will be described using a flowchart in FIG. 4. The operations will be described in accordance with steps in the flowchart.

[Step sb01] The movable platen is moved forward in the mold closing direction to the mold touch position.

[Step sb02] The absolute value Dt of the difference between the gas venting time Gt and the mold clamping operation time Ct is determined.

[Step sb03] The time t is set to 0.

[Step sb04] The controller determines whether or not the gas venting time Gt is shorter than the mold clamping operation time Ct. When the gas venting time Gt is shorter than the mold clamping operation time Ct (Yes), the controller shifts to step sb05. When the gas venting time Gt is not shorter than the mold clamping operation time Ct (No), the controller shifts to step sb09.

[Step sb05] Mold clamping is started.

[Step sb06] The controller determines whether or not the time t is equal to or longer than Dt determined in step sb02. When the time t is equal to or longer than Dt (Yes), the controller shifts to step sb08. Otherwise (No), the controller shifts to step sb07.

[Step sb07] The elapsed time from the start of the mold clamping is put in the place of time t. The controller returns to step sb06. The elapsed time from the start of the mold clamping is measured using the timer function provided in the injection molding machine.

[Step sb08] Injection is started and the processing is ended.

[Step sb09] Simultaneously with the start of the injection, mold clamping is started, and the processing is ended.

The controller for the injection molding machine according to the second embodiment performs the following control. (a) When the set gas venting time Gt is shorter than the acquired mold clamping operation time Ct (Gt<Ct, and the determination result in step sb04 is Yes; this corresponds to (1) in FIG. 1), the movable platen moves forward to the mold touch position to end the mold closing step, and then, the mold clamping step is immediately started, as is the case with the above-described first embodiment (flowchart in FIG. 3). The injection step is started when the time equal to the difference (time Dt) between the gas venting time Gt and the mold clamping operation time Ct elapses after the start of the mold clamping step.

Figure 3:
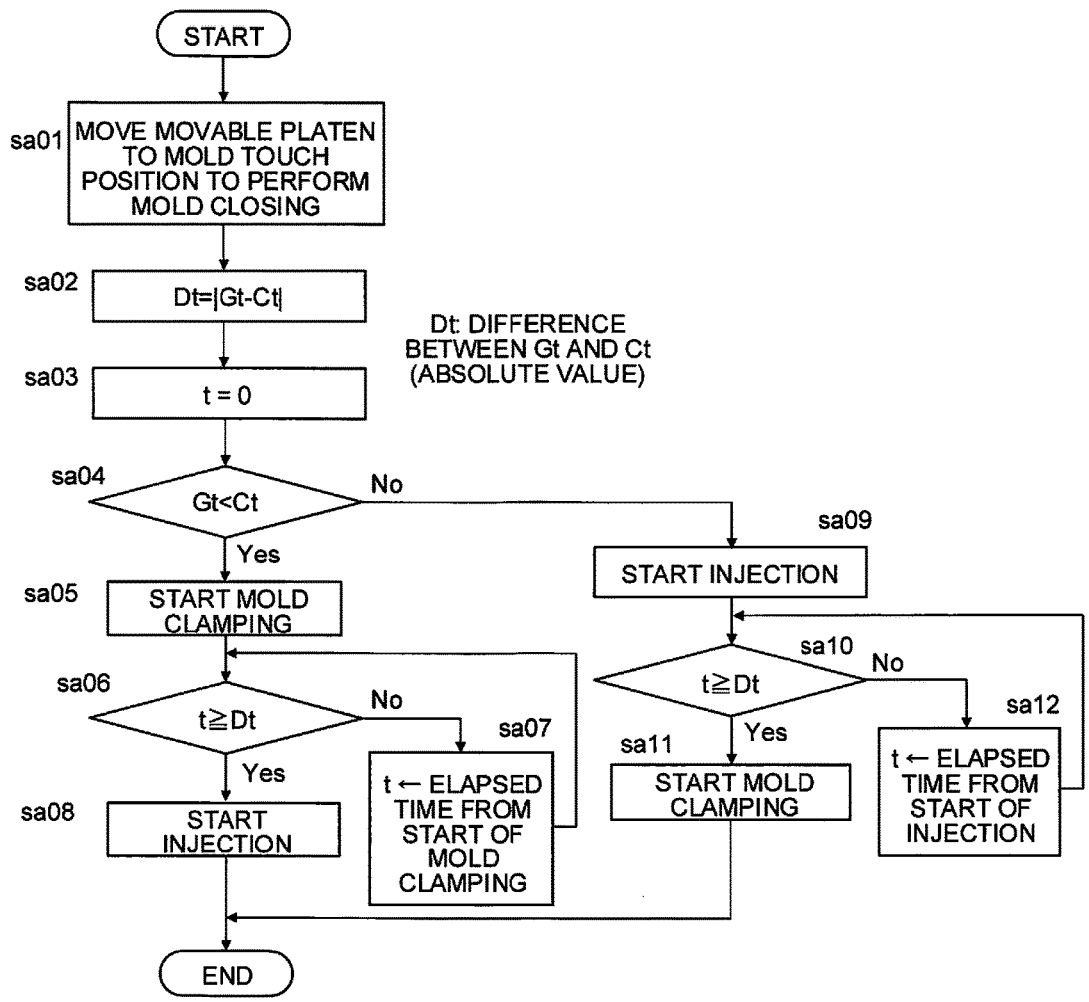
FIG. 3 is a flowchart illustrating an injection start operation and a mold clamping start operation performed by a first embodiment of a controller for the injection molding machine according to the present invention.

On the other hand, (b) when the set gas venting time Gt is longer than the acquired mold clamping operation time Ct (Gt Ct, and the determination result in step sb04 is No; this corresponds to (2) in FIG. 1), the movable platen moves forward to the mold touch position to end the mold closing step, and then, the injection step and the mold clamping step are simultaneously started without the need to wait for the elapse of the time (Dt) equal to the difference between the gas venting time Gt and the mold clamping operation time Ct, unlike in the above-described first embodiment (flowchart in FIG. 3). The purpose of this operation is to take measures against burring of a molded article and the resultant damage to the molds which may be caused by the start of injection before the start of the mold clamping step as in the first embodiment. In the second embodiment, the injection step is started simultaneously with the start of the mold clamping step to prevent possible burring and the resultant damage to the molds.

As described above, the gas venting effect is only exerted in the injection step, where the inside of the cavity in the molds is filled with resin, and it is thus necessary to set the gas venting time Gt shorter than the time for the injection step. Thus, when the time for the injection step is determined by calculations or through actual molding and it has been found that the gas venting time Gt is set to be longer than the determined time for the injection step, an alarm "Gas venting time is inappropriately set" or the like may be displayed to inform a molding operator of that.

Figure 5:
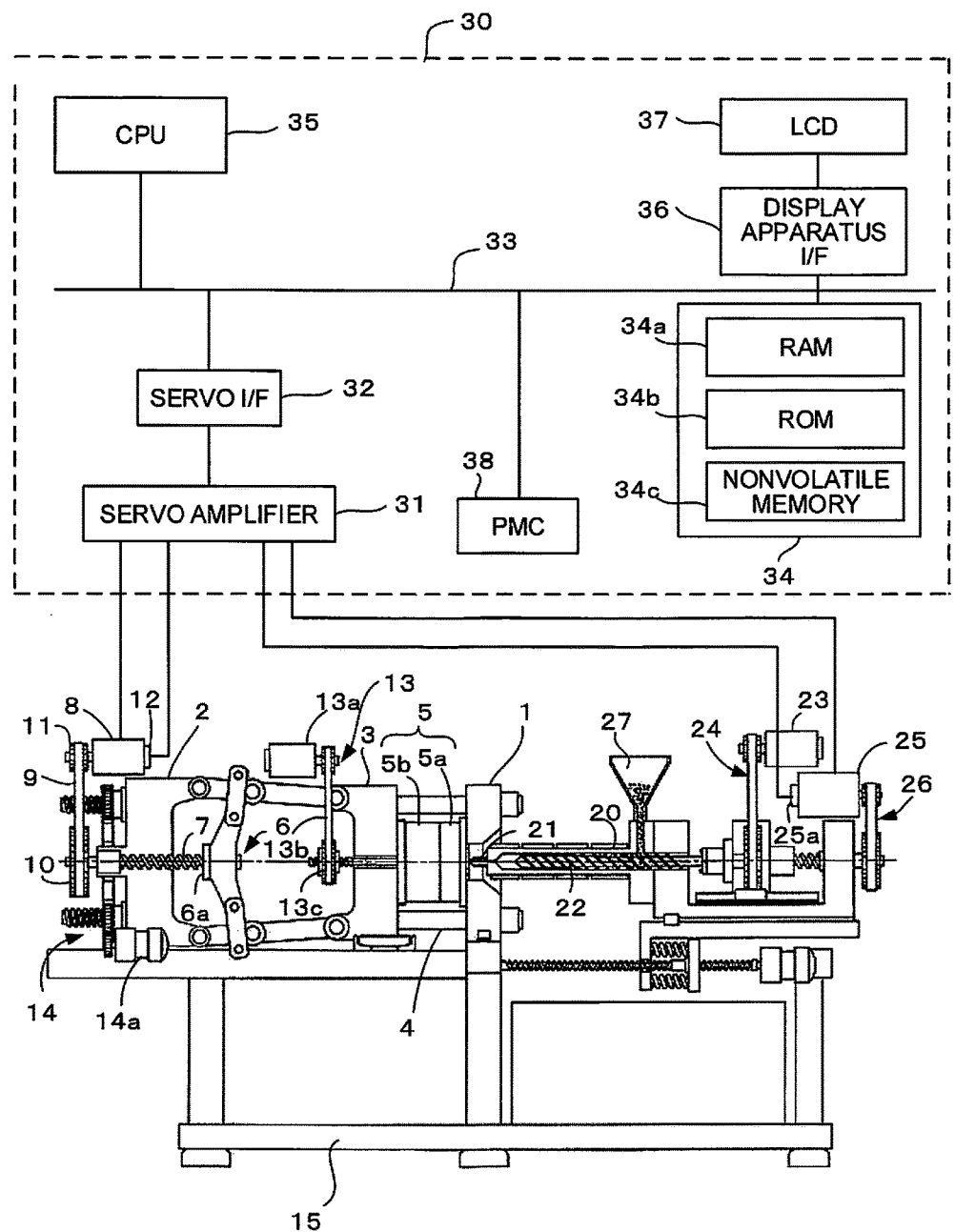
FIG. 5 is a diagram illustrating an example of the injection molding machine controlled by the controller according to the present invention.

An example of the injection molding machine controlled by the controller according to the present invention will be described using FIG. 5.

A main body section of the injection molding machine is composed of a mold clamping section and an injection section. The mold clamping section includes a fixed platen 1, a rear platen 2, a movable platen 3, a toggle link mechanism 6, and the like, which are provided on a machine base 15. The injection section includes an injection cylinder 20, an injection screw 22, a screw rotating servo motor 23, an injection servo motor 25, and the like.

First, the mold clamping section will be described. The fixed platen 1 and the rear platen 2 are coupled together via a plurality of tie bars 4. The movable platen 3 is movably disposed between the fixed platen 1 and the rear platen 2 along the tie bars 4. A mold 5 includes a fixed-side mold 5a and a movable-side mold 5b. The fixed-side mold 5a is attached to the fixed platen 1. The movable-side mold 5b is attached to the movable platen 3.

A toggle link mechanism 6 is disposed between the rear platen 2 and the movable platen 3. A nut provided on a crosshead 6a of the toggle link mechanism 6 is threadably mounted on a ball screw 7 attached to the rear platen 2 in a rotationally movable and axially immovable manner. A belt (timing belt) 9 is passed between a pulley 10 provided on the ball screw 7 and a pulley 11 provided on an output shaft of the mold clamping servo motor 8.

In the injection molding machine, the mold clamping servo motor 8 drives the ball screw 7 via a power transmission section including the pulley 11, the belt 9, and the pulley 10 to drive the toggle link mechanism 6 by moving the crosshead 6a of the toggle link mechanism 6 forward (rightward in FIG. 1) and backward (leftward in FIG. 1). The movable platen 3 is thus moved forward and backward relative to the fixed platen 1 to perform operations of closing, clamping, and opening the molds 5a and 5b.

A position/speed detector 12 that detects the rotational position and speed of the mold clamping servo motor 8 is attached to the mold clamping servo motor 8. A position feedback signal from the position/speed detector 12 allows detection of the position of the crosshead 6a and the position of the movable platen 3 (movable-side mold 5b).

An ejector apparatus is denoted by reference numeral 13. The ejector apparatus 13 is an apparatus that ejects a molded article out of the mold (movable-side mold 5b) provided on the movable platen 3. The ejector apparatus 13 transmits the rotating force of the ejector servo motor 13a to an eject pin (not shown in the drawings) via a power transmission section 13b including a pulley and a belt (timing belt) and a ball screw/nut mechanism 13c. The ejector apparatus thus ejects the eject pin into the mold (movable-side mold 5b) to eject the molded article out of the mold (movable-side mold 5b). A position/speed detector (not shown in the drawings) is attached to the ejector servo motor 13a to detect the rotational position and speed of the ejector servo motor 13a to detect the position and speed of the eject pin.

A mold clamping force adjusting mechanism provided on the rear platen 2 is denoted by reference numeral 14. The mold clamping force adjusting mechanism 14 adjusts the mold clamping force by driving a mold clamping force adjusting motor 14a to rotate, via a transmission mechanism, a nut (not shown in the drawings) that is threadably mounted on a thread formed on the tie bar 4, to change the position of the rear platen 2 with respect to the tie bar 4 (in other words, change the position of the rear platen 2 with respect to the fixed platen 1 on the machine base 15). The above-described mold clamping apparatus and ejector apparatus are conventionally provided in injection molding machines and are known.

Now, the injection section will be described. To feed a resin material into the injection cylinder 20, a hopper 27 is provided above the injection cylinder 20. A nozzle section 21 is attached to a tip of the injection cylinder 20. The injection screw 22 is inserted through the injection cylinder 20. The injection section is provided with a pressure sensor such as a load cell (not shown in the drawings) which detects the pressure of a molten resin in the injection cylinder 20.

The injection screw 22 is rotated forward and backward by the screw rotating servo motor 23 via a power transmission section 24 including a pulley and a timing belt. Furthermore, the injection screw 22 is driven by the injection servo motor 25 via a power transmission section 26 including mechanisms such as a pulley, a belt, and a ball screw/nut mechanism which convert rotating motion into linear motion. The injection screw 22 thus moves through the injection cylinder 20 in an axial direction of the injection cylinder 20. A position/speed detector (not shown in the drawings) is attached to the screw rotating servo motor 23 to detect the rotational position and speed of the injection screw 22. Additionally, a position/speed detector 25a is attached to the injection servo motor 25 to detect the axial position and speed of the injection screw 22.

Now, the controller for the injection molding machine will be described. The controller that controls the injection molding machine is denoted by reference numeral 30. The controller 30 includes a processor (CPU) 35, a memory 34 including a RAM 34a, a ROM 34b, and a nonvolatile memory 34c, a display apparatus interface 36, and a bus 33 that connects these elements together. The ROM 34b stores software that controls the injection molding machine as a whole, such as software that controls the operation of the movable platen 3 and ejection control software that controls the ejector apparatus 13. As software, a timer function to measure the elapsed time from the start of mold clamping is also stored. Moreover, the ROM 34b of the memory 34 stores software that executes processing in flowcharts depicted in FIG. 3 and FIG. 4.

An LCD (Liquid Crystal Display) 37 is connected to the display apparatus interface 36. Furthermore, servo amplifiers 31 are connected to a servo interface 32, the servo amplifiers 31 driving movable sections of the injection molding machine to control the positions and speeds of the servo motors. The position/speed detectors attached to the servo motors driving movable sections are connected to the servo amplifiers 31. An input section (not shown in the drawings) based on manual input is connected to the display apparatus interface 36. The time from the start of the injection step until the exertion of the set mold clamping force can be input as a gas venting time Gt via the input section and stored in the memory 34.

In the injection molding machine, a plurality of servo motors are used to drive a plurality of movable sections. FIG. 5 depicts only the servo amplifiers 31 for the mold clamping servo motor 8 and for the injection servo motor 25. The servo amplifiers 31 are connected to the position/speed detectors 12 and 25a of the servo motors 8 and 25, respectively. Position/speed detection signals from the position/speed detectors 12 and 25a are fed back to the respective servo amplifiers 31. The servo amplifiers for the ejector servo motor 13a and the screw rotating servo motor 23 and the position/speed detectors attached to the servo motors 13a and 23 are not depicted in the drawings.

The processor (CPU) 35 executes programs stored beforehand in the ROM 34b of the memory 34 according to molding conditions, and outputs movement commands for the movable sections of the injection molding machine to the servo amplifiers 31 via the servo interface 32. Each of the servo amplifiers 31 controls driving of the servo motors (8 and 25a) by performing position/speed feedback control based on the movement commands and position/speed feedback signals from the position/speed detectors (12 and 25a), respectively, and also performing current feedback control based on a current feedback signal from a current detector (not shown in the drawings). Each of the servo amplifiers 31 includes a processor and a memory as is the case with the related art, and executes processing such as the feedback control of the positions and speeds by means of software processing. A PMC (Programmable Machine Controller) is an apparatus configured to control the injection molding machine main body based on sequence control.

What is claimed is:

1. An injection molding controller for an injection molding machine, the injection molding controller programmed to simultaneously execute at least a part of a mold clamping step and at least a part of an injection step, the injection molding controller comprising a processor configured to
receive an input of a gas venting time from start of the injection step until completion of a mold clamping operation as a first time,
acquire an operating time for the mold clamping step as a second time,
compare the first time and the second time,
in response to the first time being shorter than the second time,
start the injection step when a time equal to a difference between the first time and the second time has elapsed after the mold clamping step is started, and
in response to the first time being longer than the second time, stop a movable platen at a mold touch position until the time equal to the difference between the first time and the second time has elapsed after the injection step is started, and then start the mold clamping step when the time equal to the difference has elapsed.

2. The injection molding controller according to claim 1, wherein the second time is acquired by actually performing the mold clamping operation using the injection molding machine and measuring the second time.

3. The injection molding controller according to claim 1, wherein the second time is calculated from a moving distance of the movable platen, a moving speed of the movable platen, an acceleration of the movable platen and a deceleration of the movable platen in the mold clamping step.

4. An injection molding controller for an injection molding machine, the injection molding controller programmed to simultaneously execute at least a part of a mold clamping step and at least a part of an injection step, the injection molding controller comprising a processor configured to receive an input of a gas venting time from start of the injection step until completion of a mold clamping operation as a first time, acquire an operating time for the mold clamping step as a second time, compare the first time and the second time, in response to the first time being shorter than the second time, start the injection step when a time equal to a difference between the first time and the second time has elapsed after the mold clamping step is started, and in response to the first time being longer than the second time, simultaneously start the injection step and the mold clamping step.

5. The injection molding controller for according to claim 4, wherein the second time is acquired by actually performing the mold clamping operation using the injection molding machine and measuring the second time.

6. The injection molding controller according to claim 4, wherein the second time is calculated from a moving distance of the movable platen, a moving speed of the movable platen, an acceleration of the movable platen and a deceleration of the movable platen in the mold clamping step.

* * * * *